3,025,139
PROCESS FOR MAKING BORON TRICHLORIDE
Robert G. Davis, Peekskill, Herman Goldfarb, New York, and John F. Heiss, White Plains, N.Y., assignors to Stauffer Chemical Company, a corporation of Delaware
No Drawing. Filed Apr. 26, 1957, Ser. No. 655,173
6 Claims. (Cl. 23—205)

This invention relates to a method of making boron trichloride and, more particularly, relates to a method of making boron trichloride utilizing boric oxide as the boron source, together with a carbonaceous material such as charcoal. The invention is conducted by introducing a mixture of a solid carbonaceous reducing agent and boron oxide into a preformed, fluidized, preheated bed, preferably of carbon, and passing chlorine therethrough at a superficial gas velocity of from about .1 to 3 ft. per second. During the reaction, the reactor is maintained at a temperature of from about 600° to about 1200° C., but a range of 700° C. to 1100° C. is preferred. Suitably, the boric oxide and carbonaceous material are from about −14 to +200 mesh in size.

In the past, it has not been practical to chlorinate boron oxide in a fluidized reactor since the boron oxide is a liquid at the reaction temperature and would cause agglomeration of the particles and collapse of the fluidized bed. It has been proposed to form briquettes of boron oxide and carbon wherein the carbon is in excess of that necessary to reduce the boron oxide and wherein the carbon acts as an adsorbent for the liquid boron oxide. A particular advantage of the present invention is that it requires no preparatory operations such as sintering or briquetting of the feed stock; the present invention is capable of utilizing feed stocks which are mere mechanical mixtures of the correct particle size.

Boron oxide reacts with carbon and chlorine to produce boron trichloride, but the reaction mixture is endothermic and thus some means of supplying heat to the reaction zone must be provided. This may be accomplished by heating the outside of the reactor, or by internal resistance heating or by introducing oxygen into the reactor.

If desired, the reaction can also be carried out with a mixture of boric oxide and a carbide such as boron carbide to provide an exothermic reaction mixture. If this is done, with proper equipment, it is not necessary to utilize external heating of the reactor. Up to 0.3 lb. boron carbide may be used for each pound of boron oxide. Further, it is possible to employ the heat in part or entirely by feeding the carbide of another metal such as the carbide of silicon, zirconium, titanium and the like. The reactor may be maintained at the desired temperature by suitable external heaters or by internal heating, such as electric resistance heating in combination with the use of a carbide feed.

The heated initial bed is preferably composed of fluidized carbon. The maximum allowable amount of $B_2O_3$, i.e., that which will not cause collapse of the fluid bed, will vary with the diluent employed. In general, larger proportions of boron oxide can be tolerated by the more adsorptive diluents, but the overall percentage is not great. For example, a maximum of 12% to 15% of $B_2O_3$ can be present in a fluid bed of activated carbons or charcoals, while 6% to 9% of $B_2O_3$ can be present in a fluidized bed of calcined petroleum coke without destroying bed fluidity. Depending upon the operating conditions, such as reaction temperature, gas velocity, chlorine efficiency and the like, the steady state concentration of boron oxide in the bed may vary from less than 1% of the total bed up to, but not exceeding, the aforementioned maximum tolerable concentrations.

Ordinarily, the solids feed consists of a mixture of boric oxide and a carbonaceous reducing agent in approximately stoichiometric proportions. The chlorine feed rate is adjusted to attain the desired superficial velocity at the given operating temperature to maintain the bed in a well-fluidized state.

Having fixed the gas (chlorine) feed rate, the solids reactant feed rate is then normally adjusted to a rate not to exceed the stoichiometric equivalent of the chlorine. The solids feed rate is further adjusted, to maintain the steady state boron oxide concentration level in the bed well within the concentration limits specified above for the various bed diluents, which represent the major bed constituent. An excess of chlorine may be used, to ensure that the steady state concentration of the reactant in the bed remains low and also to minimize the solid byproduct formation. When air or oxygen is introduced with the chlorine to supply heat to the system through the combustion of carbon, the amount of carbonaceous material in the solids feed is increased in proportion to the quantity of oxygen fed. Alternatively, in those cases where a metal carbide is employed, the proportion of carbonaceous material in the feed would be adjusted to compensate for the available carbon derived from said carbide in the feed.

The following working examples illustrate practice of the invention.

*Example 1.*—The following reaction was carried out in a 4″ I.D. quartz tube reactor. The product gas was filtered and condensed in appropriate equipment. The solid reactant used was a mixture of 66% boric oxide and 34% calcined coke. The boric oxide used was chemically 97+% boric oxide and sized as particles passing through a 60 mesh U.S. screen. The calcined coke was chemically 98+% carbon and sized in particles passing through 40 mesh and retained on 200 mesh U.S. screen.

An initial charge of 1700 gms. of the above-mentioned calcined coke was preheated to 1050° C. by external natural gas burners while fluidized by an inert gas.

The reaction was carried out with the temperature held at 1050° C. by the external natural gas burners. The feeds were 24.3 gms./min. of the above-mentioned solid reactant mix and 42.9 gms./min. of chlorine. Duration of run was three hours. Reactant conversions to the product, boron trichloride, were 89% for the boric oxide and 94% for the chlorine. The remainder of the boric oxide did not stay in the fluid bed but was recovered in solid form by filtration of the product gases. These solids were a mixture of elutriated boric oxide and a by-product formed in the reactor by reaction of boric oxide and boron trichloride. Under the reaction conditions, the concentration of boric oxide in the bed was held at under 2%.

*Example 2.*—The process of Example 1 was repeated with several exceptions, including the use of charcoal in place of calcined petroleum coke and a lower temperature. The run conditions and results are summarized as follows:

Initial bed—800 gms. activated cocoanut charcoal (99+% carbon—80 mesh).
Reaction temperature—850° C.
Feed material—66% boric oxide, 34% activated charcoal.
Solids feed rate—22.0 gms./min.
Chlorine feed rate—42.9 gms./min.
Duration of run—3 hours.
Chlorine conversion to product boron trichloride—91%.
Boric oxide conversion to product boron trichloride—94%.
Final boric oxide concentration in bed—10.5%.

*Example 3.*—The following reaction was carried out in a 4" I.D. quartz tube reactor. The product gas was filtered and condensed in appropriate equipment.

The solid reactant used was a mixture of 54.5% boric oxide, 19.1% boron carbide, and 26.2% calcined petroleum coke. The boric oxide used was chemically 97+% boric oxide and sized as particles passing through a 60 mesh U.S. screen. The boron carbide was chemically 86% boron carbide, 8% excess carbon, and 6% boric oxide and sized in particles passing through 30 mesh and retained on 200 mesh U.S. screens. The calcined coke was chemically 98+% carbon and sized in particles passing through 40 mesh and retained on 200 mesh U.S. screens. This solids feed mixture contained the following, on a pure component basis: 16.3% boron carbide, 54.3% boric oxide, 27.8% carbon, and 1.6% miscellaneous.

An initial charge of 1700 gms. of the above-mentioned calcined coke was preheated to 900° C. by external natural gas burners, while fluidized by an inert gas (nitrogen).

The reaction was carried out with the temperature held at 925° C.±25° C. by the external natural gas burners. The feeds were 20.4 gms./min. of the above-mentioned solid reactant mix and 56.0 gm./min. of gaseous chlorine. The reaction was slightly exothermic, but the extreme heat losses from the quartz tube necessitated an external heat input to the reactor. The duration of the run was 12 hours. Reactant conversions to the product boron trichloride were 92% for the boric oxide, 99+% for the boron carbide, and 89% for the chlorine. The remainder of the boric oxide did not stay in the fluid bed, but was recovered in solid form by filtration of the product gases. These solids were a mixture of elutriated boric oxide and a by-product formed in the reactor by reaction of boric oxide and boron trichloride.

Under the reaction conditions, the steady state concentrations of boron carbide and boron oxide in the fluid bed remained under 1.5% and 7%, respectively.

*Example 4.*—The following reaction was carried out in a 4" I.D. quartz tube reactor. The product gas was filtered and condensed in appropriate equipment.

The solid reactant used was a mixture of 44.5% boric oxide and 55.55% calcined coke. The boric oxide used was chemically 97+% boric oxide and sized as particles passing through a 60 mesh U.S. screen. The calcined coke was chemically 98+% carbon and sized in particles passing through 40 mesh and retained on 200 mesh U.S. screens.

An initial charge of 1700 gms. of the above-mentioned calcined coke was preheated to 1000° C. by external natural gas burners while fluidized by an inert gas.

The reaction was carried out with the temperature held at 1000° C. by the external natural gas burners. The feeds were 15.7 gms. of the above-mentioned solid reactant mix, 20.7 gms./min. of gaseous chlorine and 7.0 gms./min. of oxygen. The reaction was slightly exothermic, but the extreme heat losses from the quartz tube necessitated an external heat input to the reactor. Duration of run was three hours. Reactant conversions to the product, boron trichloride, were 91% for the boric oxide and 90+% for the chlorine. The remainder of the boric oxide did not stay in the fluid bed, but was recovered in solid form by filtration of the product gases. The solids were a mixture of elutriated boric oxide and a by-product formed in the reactor by reaction of boric oxide and boron trichloride.

Under the reaction conditions, the concentration of boric oxide in the fluid bed remained under 2%.

*Example 5.*—The following reaction was carried out in a 4" I.D. quartz tube reactor. The product gas was filtered and condensed in appropriate equipment.

The solid reactant used was a mixture of 24.2% silicon carbide, 51.4% boric oxide, and 24.4% calcined coke. The silicon carbide used was chemically 98+% silicon carbide and sized in particles passing through 70 mesh and retained on 150 mesh U.S. screens. The boric oxide was chemically 97+% boric oxide and sized as particles passing through a 60 mesh U.S. screen. The calcined coke was chemically 98+% carbon and sized in particles passing through 40 mesh and retained on 200 mesh U.S. screens.

An initial charge of 1100 gms. of the above-mentioned calcined coke and 600 gms. of the above-mentioned silicon carbide was preheated to 1000° C. by external natural gas burners while fluidized by an inert gas (nitrogen).

The reaction was carried out with the temperature held at 1000° C. by the external natural gas burners. The reaction was slightly exothermic, but the extreme heat losses from the quartz tube necessitated an external heat input to the reactor. The feeds were 17.8 gms./min. of the above-mentioned solid reactant mix and 56.0 gms./min. of gaseous chlorine. Duration of the run was three hours. Reactant conversions to the product silicon tetrachloride and boron trichloride mixture were 98% for the silicon carbide, 96% of the boric oxide, and 72% for the chlorine. The remainder of the boric oxide did not stay in the fluid bed, but was recovered in solid form by filtration of the product gases. These solids were a mixture of elutriated boric oxide and a by-product formed in the reactor by reaction of boric oxide and boron trichloride.

Under the reaction conditions, the concentration of boric oxide in the fluid bed remained under 2% and the silicon carbide concentration at about 35%. Silicon carbide appears to be less reactive than boron carbide at 1000° C. It is necessary, therefore, to maintain a relatively higher concentration of silicon carbide in the fluid bed (and an excess of chlorine) to obtain adequate conversion of the silicon carbide.

*Example 6.*—The process of Example 5 was repeated except that titanium carbide was used in place of silicon carbide. The run conditions and results are summarized as follows:

Reaction temperature—1000° C.
Solids feed material—35.3% titanium carbide (96% titanium carbide, 4% carbon, —40 +200 mesh), 47.4% boric oxide, 17.3% petroleum coke.
Solids feed rate—27.4 gms./min.
Chlorine feed rate—56.0 gms./min.
Chlorine conversion to product chlorides—91%.
Boric oxide conversion to product chlorides—95%.
Titanium carbide conversion to product chlorides—97%.
Final boric oxide concentration in bed—2.3%.
Final titanium carbide concentration in bed—4.9%.

*Example 7.*—The process of Example 1 was repeated except that provision was made for internal electrical resistance heating of the fluid bed. The electrical heat input was maintained at a level equivalent to the theoretical requirements for an adiabatic reactor. Quartz tube heat losses were compensated for by external natural gas burners. Two ¾" graphite electrodes were suspended into the fluid bed to a depth of 10" to 11". They were separated by approximately 2½" of fluid bed. The run conditions and results are summarized as follows:

Initial bed—1700 gms. calcined petroleum coke.
Reaction temperature—1000° C.
Feed material—66% boric oxide, 34% calcined coke.
Solid feed rate—21.7 gms./min.
Chlorine feed rate—40.4 gms./min.
Duration of run—5 hours.
Chlorine conversion to product $BCl_3$—92%.
Boric oxide conversion to product $BCl_3$—94%.
Final boric oxide concentration in bed—2.1%.
Bed electrical resistance—1.5 to 2 ohms.
Electrical power input—1200 to 1500 watts.

We claim:
1. The process of making boron trichloride comprising forming a heated fluidized bed of a granular, solid adsorbent carbonaceous reducing agent in a reaction zone, said bed being maintained at a temperature of from 600° to 1200° C., continuously passing chlorine through said bed while continuously introducing a stream of material selected from the class consisting of boron oxide and a mixture of boron oxide and boron carbide, the ratio of boron oxide to boron carbide in said mixture being at least 1.0:0.3 and withdrawing boron trichloride from said bed, said boron oxide being maintained at a concentration of not over 9% in said bed.

2. The process of claim 1 wherein a small amount of a metal carbide is fed with the boron oxide.

3. The process of claim 1 wherein the bed consists predominantly of carbon.

4. The process of claim 1 wherein a free oxygen containing a gas is fed into the bed to supply heat to the bed.

5. A process for making boron trichloride comprising: forming a heated fluidized bed of a granular, solid adsorbent carbonaceous reducing agent in a reaction zone, said bed being heated to and maintained at a temperature of between about 600° and about 1200° C.; continuously passing chlorine through said bed while continuously introducing a stream of material selected from the class consisting of boron oxide and a mixture of boron oxide and boron carbide, the ratio of boron oxide to boron carbide in said mixture being at least 1.0:0.3, said chlorine being introduced from beneath said bed whereby to maintain said bed in a fluidized condition, said chlorine reacting with said boron oxde to produce vaporous boron trichloride; introducing additional granular, solid, adsorbent, carbonaceous reducing agent into said reaction zone, the addition rates of said boron oxide and said carbonaceous reducing agent being so adjusted that the two are introduced in about stoichiometric proportions, the addition rate of said boron oxide being so adjusted that it does not exceed the stoichiometric equivalent of chlorine, said boron oxide concentration being maintained at a level less than about 9% of the total solids in said bed; and withdrawing said boron trichloride vapor so produced from said bed.

6. The process for making boron trichloride comprising: forming a heated fluidized bed of a granular, solid adsorbent, carbonaceous reducing agent in a reaction zone, said bed being heated to and maintained at a temperature of between about 600° and about 1200° C.; continuously passing chlorine through said bed while continuously introducing a stream of material selected from the class consisting of boron oxide and a mixture of boron oxide and boron carbide, the ratio of boron oxide to boron carbide in said mixture being at least 1.0:0.3 into said bed, said chlorine being introduced from beneath said bed whereby to maintain said bed in a fluidized condition, said chlorine reactng with said boron oxide to produce vaporous boron trichloride; introducing additional solid, granular, adsorbent, carbonaceous reducing agent into said reaction zone, said boron oxide concentration being maintained at a level less than about 9% of the total solids in said bed; and withdrawing said boron trichloride vapor so produced from said bed.

References Cited in the file of this patent

UNITED STATES PATENTS

| | | |
|---|---|---|
| 2,097,482 | Weber et al. | Nov. 2, 1937 |
| 2,369,212 | Cooper | Feb. 13, 1945 |
| 2,369,214 | Cooper | Feb. 13, 1945 |
| 2,412,667 | Arveson | Dec. 17, 1946 |
| 2,455,419 | Johnson | Dec. 7, 1948 |
| 2,674,612 | Murphree | Apr. 6, 1954 |
| 2,758,021 | Drapeau et al. | Aug. 7, 1956 |

OTHER REFERENCES

In re Edwards, 109 U.S.P.Q. 380, 1956.
Chem. Abstract, 33, 7055 (1939).